(12) United States Patent
Polzer et al.

(10) Patent No.: US 12,448,549 B2
(45) Date of Patent: Oct. 21, 2025

(54) VAE DISPERSION FOR D3 WOOD ADHESIVES

(71) Applicant: Celanese International Corporation, Irving, TX (US)

(72) Inventors: Frank Bertram Polzer, Frankfurt (DE); Daniela Hardt, Sulzbach (DE)

(73) Assignee: Celanese International Corporation, Irving, TX (US)

( * ) Notice: Subject to any disclaimer, the term of this patent is extended or adjusted under 35 U.S.C. 154(b) by 0 days.

(21) Appl. No.: 17/668,680

(22) Filed: Feb. 10, 2022

(65) Prior Publication Data

US 2022/0267651 A1 Aug. 25, 2022

Related U.S. Application Data

(60) Provisional application No. 63/148,742, filed on Feb. 12, 2021.

(51) Int. Cl.
| | |
|---|---|
| *C09J 133/10* | (2006.01) |
| *C09J 11/06* | (2006.01) |
| *C09J 123/08* | (2006.01) |
| *C09J 129/04* | (2006.01) |
| *C09J 131/04* | (2006.01) |
| *C09J 133/08* | (2006.01) |

(52) U.S. Cl.
CPC ............. *C09J 131/04* (2013.01); *C09J 11/06* (2013.01); *C09J 123/0815* (2013.01); *C09J 129/04* (2013.01); *C09J 133/08* (2013.01); *C09J 133/10* (2013.01)

(58) Field of Classification Search
CPC ... C09J 131/04; C09J 123/0815; C09J 129/04
See application file for complete search history.

(56) References Cited

U.S. PATENT DOCUMENTS

| | | | | |
|---|---|---|---|---|
| 2010/0167611 | A1* | 7/2010 | McLennan | B32B 27/30 |
| | | | | 442/43 |
| 2017/0321375 | A1* | 11/2017 | Melchin | D06N 7/00 |

FOREIGN PATENT DOCUMENTS

EP      0851015      *  7/1998     ............ C08F 218/04

OTHER PUBLICATIONS

EP0851015 A1 English Translation (Year: 1998).*

* cited by examiner

*Primary Examiner* — Catherine S Branch
*Assistant Examiner* — Huihong Qiao
(74) *Attorney, Agent, or Firm* — Kilpatrick Townsend & Stockton LLP

(57) ABSTRACT

Disclosed herein are D3 water-resistant adhesive compositions comprising aqueous copolymer dispersions and uses of such compositions. The compositions are useful as binders for porous and semi-porous substrates such as wood, paper, and/or board. Importantly, the adhesive compositions have very low formaldehyde content and little or no plasticizer content.

20 Claims, No Drawings

VAE DISPERSION FOR D3 WOOD ADHESIVES

CROSS-REFERENCE TO RELATED APPLICATION

This application claims priority to U.S. provisional application No. 63/148,742, filed on Feb. 12, 2021, the entire contents and disclosures of which are incorporated by reference herein.

FIELD OF THE INVENTION

The present invention relates to adhesive compositions comprising an aqueous copolymer dispersion. In particular, the present invention relates to such adhesive compositions having D3 water resistance, as well as to the use of such compositions to bind porous and/or semi-porous substrates.

BACKGROUND OF THE INVENTION

Aqueous, D3 water-resistant adhesives are predominantly composed of polyvinyl alcohol-stabilized polyvinyl acetate homopolymers that include either an internal crosslinking system (e.g., N-methylol acrylamide, see for example U.S. Pat. No. 5,439,960 or EP-A-0,561,221) and/or a post-added resin (for example EP-B-623,661). Such internal crosslinking systems and/or post-added resins provide water resistance but are also sources of formaldehyde. Formaldehyde is classified as a mutagen which may cause cancer. Therefore, there is an increasing need for adhesive compositions which reduce the presence of formaldehyde, especially for indoor applications.

Since polyvinyl alcohol-stabilized polyvinyl acetate homopolymers exhibit a glass transition temperature of around 40° C., adhesive compositions comprising such homopolymers typically require the addition of a film forming agent to lower the minimum film formation temperature (MFFT) to room temperature and below. Film forming agents are generally considered as (semi-)volatile organic components, which may be undesirable in many applications (e.g., for indoor applications). Therefore, there is an increasing need for adhesive compositions which reduce or eliminate the presence of film forming agents.

Given these considerations, there is a continuing need to identify new adhesive compositions which display high water resistance, high heat resistance, and low MFFT with low formaldehyde content and no plasticizers (including film forming agents). As described herein, it has been found that in particular aqueous copolymer dispersions may be used to form adhesive compositions having this desirable combination of features.

SUMMARY OF THE INVENTION

In one aspect, provided herein is an adhesive composition comprising an aqueous copolymer dispersion comprising: at least one copolymer of a vinyl ester of a $C_{1-13}$ alkanoic acid co-monomer, an alpha-olefin co-monomer, and at least one auxiliary co-monomer selected from the group consisting of N-alkylol-containing co-monomers, unsaturated silane co-monomers, glycidyl co-monomers, cyclic ureido co-monomers, acrylamido glycolic acid co-monomers, and combinations thereof; and at least one stabilizer selected from the group of polyvinyl alcohols; wherein the copolymer comprises, based on dried polymer, from 60 to 95 wt % of the $C_{1-13}$ alkanoic acid, from 1 to 35 wt % of the alpha-olefin, from 0.1 to 5.0 wt % of the at least one auxiliary co-monomer, and from 0.5 to 20 wt % of the at least one stabilizer; and wherein the adhesive composition has an MFFT lower than 15° C., a D3-3 bond strength greater than 2 N/mm² according to DIN EN 204:2016, and a bond strength greater than 4 N/mm² according to DIN EN 14257: 2019 (WATT91). In some embodiments, the vinyl ester of a $C_{1-13}$ alkanoic acid is vinyl acetate. In some embodiments, the alpha-olefin is ethylene. In some embodiments, the auxiliary co-monomer in the adhesive composition comprises at least one N-alkylol-containing co-monomer. In some embodiments, the auxiliary co-monomer in the adhesive composition comprises from 0.25 to 1.5 wt %, preferably 0.3 to 1.0 wt %, more preferably 0.35 to 0.75 wt % N-methylol acrylamide.

In some embodiments, the adhesive composition provided herein comprises an aqueous copolymer dispersion comprising an additional co-monomer, preferably selected from the group consisting of esters of methacrylic acid, esters of acrylic acid, vinyl halides, and combinations thereof. In some embodiments, the aqueous copolymer dispersion comprises 2 wt % to 10 wt %, preferably 4 wt % to 8 wt % and most preferably at least 5 wt % to 7 wt % of polyvinyl alcohol based on dried polymer. In some embodiments, the relative ratio of polyvinyl alcohols with a degree of hydrolysis greater than 90 mol % and/or ethylene-modified polyvinyl alcohol copolymers to polyvinyl alcohols with a degree of hydrolysis equal or smaller than 90 mol % is 0 to 0.5, preferably 0.13 to 0.33, and most preferably 0.2 to 0.25. In some embodiments, the relative ratio of polyvinyl alcohols with a Hoeppler viscosity greater than 16 mPa*s is larger than 25 wt %, preferably larger than 50 wt %, more preferably larger than 65 wt % and most preferably larger than 70 wt %, based on the total amount of polyvinyl alcohol in the adhesive composition. In some embodiments, the adhesive composition comprises an aqueous polyvinyl ester copolymer dispersion with a solid content of 65 wt % or less, based on the total weight of the copolymer dispersion, preferably in the range of 30 to 65 wt %, more preferably 40 to 60 wt %, and most preferably 45 to 55 wt %.

In some embodiments, the adhesive composition provided herein comprises less than 300 ppm formaldehyde, preferably less than 150 ppm formaldehyde, more preferably less than 50 ppm formaldehyde, and most preferably less than 25 ppm formaldehyde. In some embodiments, the adhesive composition comprises less than 1 wt % plasticizer, preferably less than 0.5 wt % plasticizer, more preferably less than 0.1 wt % plasticizer, and most preferably no measurable plasticizer. In some embodiments, the adhesive composition has a bond strength according to DIN EN 14257:2019 (WATT 91) of at least 4.5 N/mm², preferably at least 5 N/mm², more preferably at least 5.5 N/mm², and most preferably at least 6 N/mm². In some embodiments, the adhesive composition has a D3-3 bond strength according to DIN EN 204:2016 of at least 2.5 N/mm², preferably at least 2.75 N/mm², and more preferably at least 3 N/mm². In some embodiments, the copolymer dispersion has a minimum film forming temperature (MFFT) of less than 10° C., preferably less than 7° C., more preferably less than 4° C. In some embodiments, the copolymer dispersion has a glass transition temperature (Tg) of 30° C. or less, preferably 25° C. or less, and more preferably 23° C. or less. In some embodiments, the adhesive composition has a gel strength (ICI) after 20 days at 50° C. of less than 120 gm/cm, preferably less than 50 gm/cm, more preferably less than 30 gm/cm, and most preferably less than 25 gm/cm.

In some embodiments, the adhesive composition provided herein comprises an aqueous copolymer dispersion comprising: from 60 to 95 wt % vinyl acetate, from 1 to 35 wt % ethylene, and from 0.25 to 1.5 wt % N-methylol acrylamide based on dry polymer; and the adhesive composition has an MFFT lower than 15° C., a D3-3 bond strength greater than 2 N/mm$^2$ according to DIN EN 204:2016, and a bond strength greater than 4 N/mm$^2$ according to DIN EN 14257: 2019 (WATT 91).

In some embodiments, the adhesive composition provided herein comprises a copolymer dispersion, wherein at least 40 wt %, preferably at least 50 wt %, more preferably at least 60 wt %, and most preferably at least 65 wt % of at least one co-monomer, based on the total amount of co-monomer utilized in the reaction, is added to the reactor before the initiation of polymerization.

In another aspect, provided herein is a method of using the adhesive compositions described herein for adhesively bonding porous or semi-porous substrates, preferably including wood, paper, and/or board, and more preferably including wood.

DETAILED DESCRIPTION OF THE INVENTION

I. Introduction

In general, this disclosure relates to D3 water-resistant adhesive compositions and to use of such compositions. As used herein, D3 refers to a durability grading level according to European standard DIN EN 204. This standard classifies thermoplastic wood glues into categories D1 through D4 by increasing order of water resistance. D3 adhesive compositions are classified as water-resistant, and they are particularly well suited for interior areas with frequent long-term exposure to running or condensed water, as well as exterior areas not exposed to weather. Within each category, adhesives may be further divided based on storage life. As an example, an adhesive composition classified as D3-3 according to DIN EN 204:2016 maintains a bond strength of greater than 2 N/mm$^2$ after storage for 7 days at standard ambient conditions and storage of a test specimen in cold water for 4 days.

The compositions described herein are useful as binders for porous and semi-porous substrates such as wood, paper, and/or board. Importantly, the compositions have a high heat resistance (i.e., a bond strength greater than 4 N/mm$^2$ according to DIN EN 14257:2019 (WATT 91)) and a high water resistance (i.e., a D3-3 bond strength greater than 2 N/mm$^2$ according to DIN EN 204:2016) for use as effective binders in many applications, while still maintaining a low minimum film formation temperature (i.e., lower than 15° C.). The compositions described herein, having this combination of characteristics, may be useful in many applications, especially including interior woodworking. In some aspects, the adhesive compositions have very low formaldehyde content and little or no plasticizer content.

II. The Vinyl Ester/Alpha-Olefin Copolymer

One component of the adhesive compositions described herein comprises a copolymer of a vinyl ester co-monomer, an alpha-olefin co-monomer, and at least one auxiliary (functional) comonomer. In some embodiments, the copolymer is an emulsion copolymer. In a preferred embodiment, the copolymer comprises at least two different main co-monomers which, along with appropriately selected functional co-monomers, have been emulsion polymerized to form an aqueous copolymer dispersion or latex.

Emulsion Polymer Monomers

A preferred type of main co-monomer for use in forming the copolymer dispersion described herein comprises vinyl ester co-monomers. In some embodiments, the vinyl ester is a vinyl ester of a $C_{1-13}$ alkanoic acid. The vinyl ester may be present from 20 to 99 weight percentage (wt %), e.g., from 40 to 95 wt %, from 55 to 95 wt %, or from 60 to 95 wt %. Unless indicated otherwise, the term "weight percentage" (abbreviated "wt %"), as used herein, applies to the amount by weight of a copolymer component present in the copolymer as a percentage of the total weight of the copolymer (based on dried polymer). The vinyl ester employed is generally a vinyl ester of a saturated carboxylic acid having 1 to 13, typically 2 to 8, carbon atoms, especially vinyl acetate. A non-limiting list of such vinyl esters includes vinyl formiate, vinyl acetate, vinyl propionate, vinyl butyrate, vinyl isobutyrate, vinyl valerate, vinyl laurate, vinyl-2-ethyl-hexanoate, vinyl isooctanoate, vinyl nonate, vinyl decanoate, vinyl pivalate, vinyl versatate, and combinations thereof. As indicated, vinyl acetate is a preferred vinyl ester co-monomer because of its availability and low cost.

A second preferred type of main co-monomer for use in forming the copolymer dispersion described herein comprises alpha-olefin co-monomers. The alpha-olefin may be present from 1 to 35 wt %, e.g., from 1 to 25 wt %, from 1 to 15 wt %, or from 1 to 10 wt %. As used herein, the term "alpha-olefin" refers to an alkene compound (or olefin) with a double bond at the primary (or alpha) position. In some embodiments, the alpha-olefin comprises a branched hydrocarbon chain. In some embodiments, the alpha-olefin comprises a linear hydrocarbon chain. A non-limiting list of such alpha-olefins includes propene, 1-butene, 1-hexene, 1-octene, 1-decene, 1-dodecene, 1-tetradecene, 1-hexadecene, 1-octadecene. In a preferred embodiment, the alpha-olefin comprises ethylene.

A preferred embodiment of the copolymer dispersion comprises vinyl acetate and ethylene as the at least two main co-monomers.

In some embodiments, the aqueous copolymer dispersion comprises additional (main) co-monomers, preferably selected from the group consisting of esters of methacrylic acid, esters of acrylic acid, vinyl halides, and combinations thereof.

The copolymer dispersion described herein may also comprise at least one of a variety of auxiliary co-monomers. The at least one auxiliary co-monomer may be present from 0.01 to 10 wt %, e.g., from 0.05 to 10 wt %, from 0.1 to 10 wt %, from 0.1 to 8 wt %, from 0.1 to 5 wt %, from 0.2 to 10 wt %, from 0.2 to 8 wt %, or from 0.2 to 5 wt %, based on the dry polymer. In some embodiments, the at least one auxiliary co-monomer may serve to provide or facilitate crosslinking between copolymer chains within the copolymer dispersion described herein. In some embodiments, the at least one auxiliary co-monomer may stabilize the copolymer dispersion. In some embodiments, the at least one auxiliary co-monomer may promote enhanced adhesion. Such enhanced adhesion can include, for example, increased adhesion to surfaces or substrates, improved wet adhesion, better resistance to removal by weathering or abrasion, and improved rigidity.

Auxiliary co-monomers useful for incorporation into the copolymer dispersion described herein are those which contain at least one polymerizable double bond along with one or more additional functional moieties. Such optional or auxiliary co-monomers can thus include N-alkylol-containing co-monomers, N-methylol ether-containing co-monomers, unsaturated silane co-monomers, glycidyl co-monomers, cyclic ureido co-monomers, acrylamide glycolic acid, esters of acrylic acid, esters of methacrylic acid, vinyl halides, and combinations of these auxiliary optional co-monomers.

Suitable co-monomers containing N-alkylol groups are selected from the group consisting of N-methylol acrylamide, N-methylol methacrylamide, N-methylol allylcarbamate, N-methylol maleamide, N-methylol maleamic acid, and the N-methylol amides of aromatic vinyl carboxylic acids. In a preferred embodiment, the copolymer dispersion comprises N-methylol acrylamide. In a preferred embodiment, the N-methylol acrylamide is provided as aqueous solution comprising less than 0.5% formaldehyde. For example, Aerotex NMA-LF (Allnex) or Flocryl NMA 2820 (SNF) are aqueous solutions comprising 28 wt % N-methylol acrylamide, 20 wt % acrylamide, and less than 0.2 wt % formaldehyde. In a preferred embodiment, the copolymer dispersion may comprise from 0.25 to 1.5 wt %, preferably 0.3 to 1.0 wt %, most preferably 0.35 to 0.75 wt % N-methylol acrylamide, based on dried polymer.

In some embodiments, the copolymer dispersion described herein may also comprise polyethylenically unsaturated co-monomers. Such co-monomers can include, for example, diallyl phthalate, diallyl maleate, triallyl cyanurate, tetraallyloxyethane, divinylbenzene, butanediol 1,4-dimethacrylate, triethylene glycol dimethacrylate, divinyl adipate, allyl(meth)acrylate, vinyl crotonate, methylenebisacrylamide, hexanediol diacrylate, butandiol diacrylate, pentaerythritol diacrylate and trimethylolpropane triacrylate. In some embodiments, these co-monomers may be present from 0.01 to 10 wt %, preferably 0.01 to 2 wt %.

Unsaturated silanes useful as auxiliary co-monomers can generally correspond to a substituted silane of the structural Formula I:

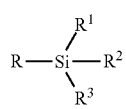

Formula I in which R denotes an organic radical olefinically unsaturated in the w-position and $R^1$, $R^2$ and $R^3$ which may be identical or different, denote halogen, preferably chlorine, or the group —OZ, Z denoting hydrogen or primary or secondary alkyl or acyl radicals optionally substituted by alkoxy groups. Suitable unsaturated silane compounds of the Formula I are preferably those in which the radical R in the formula represents an w-unsaturated alkenyl of 2 to 10 carbon atoms, particularly of 2 to 4 carbon atoms, or an w-unsaturated carboxylic acid ester formed from unsaturated carboxylic acids of up to 4 carbon atoms and alcohols carrying the Si group of up to 6 carbon atoms. Suitable radicals $R^1$, $R^2$, $R^3$ are preferably the group —OZ, Z representing primary and/or secondary alkyl radicals of up to 10 carbon atoms, preferably up to 4 carbon atoms, or alkyl radicals substituted by alkoxy groups, preferably of up to 3 carbon atoms, or acyl radicals of up to 6 carbon atoms, preferably of up to 3 carbon atoms, or hydrogen. Most preferred unsaturated silane co-monomers are vinyltrialkoxysilanes.

Examples of preferred silane compounds of Formula I include γ-methacryloxypropyltris(2-methoxyethoxy)silane, vinylmethoxysilane, vinyltriethoxysilane, vinyldiethoxysilanol, vinylethoxysilanediol, allyltriethoxysilane, vinyltripropoxysilane, vinyltriisopropoxysilane, vinyltributoxysilane, vinyltriacetoxysilane, trimethylglycolvinylsilane, γ-methacryloxypropyltrimethylglycolsilane, γ-acryloxypropyltriethoxysilane and γ-methacryloxypropyltrimethoxysilane.

Glycidyl compounds can also be used as auxiliary co-monomers in the copolymer dispersion. Glycidyl compounds are epoxy-containing materials and can facilitate crosslinking of the emulsion copolymers in the copolymer blend. Examples of suitable glycidyl co-monomers include glycidyl acrylate, glycidyl methacrylate, allyl glycidyl ether, vinyl glycidyl ether, vinyltoluenes and styrenes substituted with a glycidyl radical in the aromatic moiety, and vinylbenzoates substituted with a glycidyl radical in the aromatic moiety.

Another type of auxiliary co-monomer for use in the copolymer dispersion comprises cyclic ureido co-monomers. Cyclic ureido co-monomers are known to impart improved wet adhesion properties to films and coatings formed from copolymers containing these co-monomers. Cyclic ureido compounds and their use as wet adhesion promoting co-monomers are disclosed in U.S. Pat. Nos. 4,104,220; 4,111,877; 4,219,454; 4,319,032; 4,599,417 and 5,208,285. The disclosures of all of these U.S. patents are incorporated herein by reference in their entirety.

A preferred embodiment of the copolymer dispersion comprises vinyl acetate and ethylene as the at least two main co-monomers, along with N-methylol acrylamide as the at least one auxiliary co-monomer.

Additional Emulsion Components

In some embodiments, the copolymer dispersion described herein comprises at least one stabilizer selected from the group consisting of protective colloid stabilizers, emulsifiers, and combinations thereof. The at least one stabilizer may be present from 0.5 to 20 wt %, e.g., from 1 to 15 wt %, from 1 to 10 wt %, from 2 to 10 wt %, or from 3 to 8 wt %, based on dried polymer.

In some embodiments, the copolymer dispersion described herein comprises a protective colloid stabilizer. A preferred protective colloid stabilizer is polyvinyl alcohol (PVOH). In some embodiments, the aqueous copolymer dispersion comprises 1 wt % to 15 wt %, such as 2 wt % to 10 wt %, preferably 4 wt % to 8 wt % and most preferably at least 5 wt % to 7 wt % of polyvinyl alcohol based on dried polymer.

Partially saponified polyvinyl alcohol, i.e. with a degree of hydrolysis equal or smaller than 90 mol %, preferably 80 to 90 mol %, more preferably 85 to 90 mol %, and most preferably 86-90 mol %, may be utilized as well as fully saponified polyvinyl alcohol, i.e. with a degree of hydrolysis greater than 90 mol %, preferably greater than 92 mol %, more preferably greater than 95 mol %, and as well as functional polyvinyl alcohols such as the formal copolymers of vinyl alcohol and, if desired, vinyl acetate with ethylene, with vinyl acetoacetate or isopropenyl alcohol, or those containing carboxyl groups or alkoxysilane groups. In some embodiments, the relative ratio of polyvinyl alcohols with a degree of hydrolysis greater than 90 mol % and/or functional (e.g. ethylene-modified) polyvinyl alcohol copolymers to polyvinyl alcohols with a degree of hydrolysis equal or smaller than 90 mol % is 0 to 0.5, preferably 0.13 to 0.33, and most preferably 0.2 to 0.25.

The polyvinyl alcohols described herein are characterized by Hoeppler viscosities (as measured at 4 wt % in aqueous solutions at 20° C. according to DIN 53015:2001) of from 2 to 70 mPa*s, e.g., from 2 to 50 mPa*s, preferably from 3 to 45 mPa*s, more preferably from 5 to 40 mPa*s, and most preferably from 6 to 35 mPa*s. In some embodiments, the relative ratio of polyvinyl alcohols with a Hoeppler viscosity greater than 16 mPa*s is larger than 25 wt %, preferably larger than 50 wt %, more preferably larger than 65 wt % and most preferably larger than 70 wt %, based on the total amount of polyvinyl alcohol in the adhesive composition.

As protective colloids it is additionally possible to use etherified cellulose derivatives, examples being hydroxyethylcellulose, hydroxypropylcellulose, hydroxypropylmethylcellulose and carboxymethylcellulose. Likewise, suitable are polycarboxylic acids such as polyacrylic acid and also copolymers of maleic acid or of maleic anhydride with ethylenically unsaturated compounds such as methyl vinyl ether or styrene. Also suitable are polyalkylene glycols or the alkali metal salts of polyacrylic acids and polymethacrylic acids, starch derivatives and gelatin derivatives, 2-acrylamido-2-methylpropanesulfonic acid and/or 4-styrenesulfonic acid copolymers and their alkali metal salts, but also homopolymers and copolymers of N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides.

A detailed description of further suitable protective colloids may be found in Houben-Weyl, Methoden der organischen Chemie, volume XIV/1, Makromolekulare Stoffe [Macromolecular Compounds], Georg-Thieme-Verlag, Stuttgart, 1961, pages 411 to 420. Preference is given to the predominant use of polyvinyl alcohol.

In some embodiments, the copolymer dispersions may additionally comprise anionic and/or nonionic emulsifiers as stabilizers. These emulsifiers, if present, are present typically in amounts of up to 4 wt %, for example, 0.05 to 3 wt % or 0.1 to 2 wt %. Compounds suitable for this purpose may be found in relevant compilations known in the art, such as the Surfactant Applications Directory (D. R. Karsa et al., Ed., Blackie, London 1991) or in Houben-Weyl, Methoden der organischen Chemie, volume XIV/1, Makromolekulare Stoffe [Macromolecular Compounds], Georg-Thieme-Verlag, Stuttgart, 1961, pages 190 to 208.

Suitable anionic emulsifiers include sodium, potassium and ammonium salts of linear and branched aliphatic carboxylic acids of chain length $C_{12}$-$C_{20}$, sodium hydroxyoctadecanesulfonate, sodium, potassium and ammonium salts of hydroxy fatty acids of chain length $C_{12}$-$C_{20}$ and their sulfation and/or acetylation products thereof, alkyl sulfates, also in the form of triethanolamine salts, alkyl-($C_{10}$-$C_{20}$)-sulfonates, alkyl($C_{10}$-$C_{20}$)-arylsulfonates, and sulfation products thereof, alkali metal salts of sulfosuccinic esters with aliphatic saturated monohydric alcohols of chain length $C_4$-$C_{16}$, sulfosuccinic 4-esters with polyethylene glycol ethers of monohydric aliphatic alcohols of chain length $C_{10}$-$C_{12}$ (disodium salt), sulfosuccinic 4-esters with polyethylene glycol nonylphenyl ether (disodium salt), sulfosuccinic acid biscyclohexyl ester (sodium salt), lignosulfonic acid and the calcium, magnesium, sodium and ammonium salts thereof, resin acids, hydrogenated and dehydrogenated resin acids and alkali metal salts thereof, sodium (dodecylated diphenyl ether) disulfonate and sodium laurylsulfate, or ethoxylated sodium lauryl ether sulfate. It is also possible to use mixtures of anionic emulsifiers. Preferably, the aqueous copolymer dispersion does not comprise any anionic emulsifier.

Suitable nonionic emulsifiers include acyl, alkyl, oleyl and alkylaryl ethoxylates. Examples include, but are not limited to, ethoxylated mono-, di- and trialkylphenols (EO: from 3 to 50, alkyl substituted radical: $C_4$ to $C_{12}$) and ethoxylated fatty alcohols (EO: from 3 to 80; alkyl radical: $C_8$ to $C_{36}$), especially $C_{12}$-$C_{14}$-fatty alcohol ethoxylates, $C_{13}$-$C_{15}$-oxo alcohol ethoxylates, $C_{16}$-$C_{18}$-fatty alcohol ethoxylates, $C_{1-10}$-oxo alcohol ethoxylates, $C_{1-3}$-oXo alcohol ethoxylates, olyoxyethylene sorbitanmonooleate with ethylene oxide groups, copolymers of ethylene oxide and propylene oxide with a minimum content of 10% by weight of ethylene oxide, the polyethylene oxide ethers of oleyl alcohol, the polyethylene oxide ethers of nonylphenol, and the polyethylene oxide ethers of fatty alcohols, especially those of $C_{12}$-$C_{14}$-fatty alcohols. It is also possible to use mixtures of nonionic emulsifiers. Preferably, the aqueous copolymer dispersion does not comprise any nonionic emulsifier.

In a preferred embodiment, the aqueous copolymer dispersion neither comprises anionic emulsifiers nor nonionic emulsifiers.

Emulsion Polymer Preparation

The copolymer dispersion described herein may be formed by using conventional emulsion polymerization procedures, with or without pressurization. In a typical polymerization procedure, the vinyl ester, alpha-olefin, and any auxiliary co-monomers may be polymerized in an aqueous medium in a suitable polymerization vessel under pressures not exceeding 100 atmospheres in the presence of a catalyst component and at least one emulsifying agent. The aqueous reaction mixture in the polymerization vessel may be maintained by a suitable buffering agent at a pH of about 2 to 9. The emulsion polymerization may be typically be carried out at a temperature in the range from 50° C. to 100° C. Monomer conversion can typically range from 95 to above 99 percent.

The manner of combining the polymerization ingredients, i.e., stabilizers, co-monomers, catalyst system components, etc., can vary widely. Generally, an aqueous medium containing at least some of the stabilizer(s) may be initially formed in the polymerization vessel with the various other polymerization ingredients being added to the vessel thereafter.

The optional co-monomers may be added to the polymerization vessel continuously, incrementally or as a single charge addition of the entire amounts of co-monomers to be used. Co-monomers may be employed as pure monomers or may be used in the form of a pre-mixed aqueous emulsion. Ethylene as a co-monomer may be pumped into the polymerization vessel and maintained under appropriate pressure therein.

Catalyst system components can also be added to the polymerization vessel continuously, incrementally in stages, or as a single charge addition. Suitable polymerization catalysts include the water-soluble free-radical-formers (initiators) generally used in emulsion polymerization, such as hydrogen peroxide, sodium persulfate, potassium persulfate and ammonium persulfate, as well as tert-butyl hydroperoxide, in amounts of between 0.01 and 3 wt %, preferably between 0.01 and 1 wt %, based on the total weight of the emulsion. These materials may be used together with reducing agents such as sodium formaldehyde-sulfoxylate, sodium dithionite, sodium hydrogen sulfite, sodium sulfite, sodium thiosulfate, disodium 2-hydroxy-2-sulfinicaceticacid, disodium 2-hydroxy-2-sulfonicaceticacid, ascorbic acid and its epimer as redox catalysts in amounts of 0.01 to 3 wt %, preferably 0.01 to 1 wt %. The free-radical-formers may be added to the aqueous emulsifier solution initially present in the polymerization vessel or may be added during the polymerization in staged doses. When redox systems are to be formed in the polymerization vessels, the initiator should be added separately, e.g., in separate solutions, from the reducing agent(s). When redox systems are to be formed, the use of redox catalysts may be beneficial. Such redox catalysts include, but are not limited to, iron salts of the oxidation state +2 or +3, e.g., ferric chloride, ferrous chloride, ferrous sulfate, ammonium iron (II) sulfate, and various hydrates thereof.

As noted, the entire amount of the aqueous medium with the polymerization additives may be present in the polymerization vessel before introduction of the co-monomers. Alternatively, the aqueous medium, or a portion of it, may be added continuously or incrementally during the course of the polymerization.

In a typical polymerization procedure, the polymerization reactor may be filled with an aqueous protective colloid and/or protective colloid/emulsifier solution. Then at least a part of the co-monomers to be polymerized are added. After this initial reaction mixture is homogenized via agitation, polymerization may be started by adding at least a part of the catalyst system in order to prepare in situ seed material. Thereafter incremental or continuous addition of the remaining co-monomers and catalyst system components may be carried out to complete the preparation of the emulsion polymer. Alternatively, instead of preparation of in situ seed material, an aqueous medium containing a seed dispersion may be separately prepared and added to the polymerization vessel, again followed by addition of the remaining co-monomers and catalyst material.

In some embodiments, at least 40 wt %, preferably at least 50 wt %, more preferably at least 60 wt %, and most preferably at least 65 wt % of at least one co-monomer, based on the total amount of co-monomer utilized in the reaction, is added to the reactor before the initiation of polymerization (pre-charge).

In some embodiments, the ratio of the at least one $C_{1-13}$ alkanoic acid (e.g., vinyl acetate) to the at least one alpha-olefin (e.g., ethylene) in the pre-charge is at least 5, preferably at least 10, more preferably 20, and most preferably at least 35.

Emulsion Polymer Characteristics

The copolymer dispersions as prepared herein will generally have a viscosity which ranges from 2000 mPa*s to 30000 mPa*s at 25-65% solids, more preferably from 5000 mPa*s to 20000 mPa*s, and most preferably from 7500 mPa*s to 12500 mPa*s. Viscosity is preferentially determined following DIN EN ISO 2555:1999 at 20° C. and 20 rpm using an appropriate spindle, e.g., Brookfield spindles #5 or #6. Spindles may be chosen based on optimum viscosity ranges as specified by the instrument manufacturer. Viscosity may be adjusted by the addition of thickeners and/or water to the copolymer dispersion. Suitable thickeners can include polyacrylates or polyurethanes, such as Borchi® Gel L75 and Tafigel® PUR 60. Alternatively, the copolymer dispersion may be substantially free of thickeners.

The copolymer dispersions as described herein will generally have a (mid-point) glass transition temperature (Tg) of 30° C. or less, preferably 25° C. or less, and more preferably 23° C. or less, as measured by differential scanning calorimetry (DSC) according to DIN EN ISO 16805:2005-07.

The copolymer dispersions described herein will generally have a grit level below 0.1 wt %, preferably below 0.01 wt %, as measured by filtering an amount of copolymer dispersion through a 40 micron mesh, drying the grit, weighing the dried grit, and expressing the grit level as a percentage of the weight of the wet dispersion. A detailed description of the test method may be found in the experimental section.

Following polymerization, the solid content of the aqueous copolymer dispersions described herein may be adjusted to the desired level by the addition of water or by the removal of water by distillation. Generally, the desired level of polymeric solids after polymerization is less than 65 wt %, preferably in the range of 30 to 65 wt %, more preferably in the range of 40 to 60 wt %, and most preferably in the range of 45 to 55 wt %, based on the total weight of the copolymer dispersion. The solid content is preferably determined according to DIN EN ISO 3251:2008.

The copolymer dispersions described herein will generally have a minimum film-formation temperature (MFFT) of less than 10° C., preferably less than 7° C. and more preferably less than 4° C. according to DIN ISO 2115-2001-04.

III. Adhesive Composition

Provided herein are adhesive compositions comprising the aqueous copolymer dispersion described above. The adhesive compositions may be formed by adding a suitable Lewis acid, preferably $AlCl_3$ or $Al(NO_3)_3$, to the aqueous copolymer dispersion, as described in the examples below. Additional auxiliary components may be added, as described below.

The adhesive compositions of the present disclosure are unplasticized, i.e., contain very low amounts of plasticizers or are free of plasticizers. As used herein, the term "plasticizer" includes all substances, except for water, that enhance the formation of a homogeneous polymer film, including solvents (e.g., organic solvents), film-forming agents, coalescing agents, and combinations thereof. This includes components commonly referred to as plasticizers, as well as components that may function as a plasticizer. Specifically, the adhesive composition may have low amounts of or be free of plasticizers including, but not limited to, phthalates, benzoates, butyldiglycol acetate, dibutylglycol acetate, triacetin (1,3-bis(acetyloxy)propan-2-yl acetate), propylene carbonate, propylene glycol phenyl ether, Benzoflex™ 2088, glycolic acid-n-butylester (Polysolvan® O). As used herein, "very low amounts of plasticizers" is defined as less than 1 wt %, preferably less than 0.5 wt %, more preferably less than 0.1 wt %, based on the total weight of the adhesive composition. In a preferred embodiment, the adhesive composition of the present disclosure is free of plasticizer, i.e., contains no measurable plasticizer.

The adhesive compositions provided herein also have very low formaldehyde content. As used herein, "very low formaldehyde content" is defined as less than 300 parts per million by weight (ppm) formaldehyde, preferably less than 150 ppm formaldehyde, more preferably less than 50 ppm formaldehyde, and most preferably less than 25 ppm formaldehyde. Formaldehyde may be determined by any method known in the art. Preferably, formaldehyde content is determined via high-performance liquid chromatography (HPLC) according to ISO 15373:2001-10-09.

The adhesive composition may further comprise auxiliary components, including, for example, fillers, dispersing agents, defoamers, biocides, starches, and combinations thereof. It is understood that when auxiliary components are included in the adhesive composition, they are not plasticizers and do not function as plasticizers. It is further understood that auxiliary components are chosen and added such that heat resistance and final bonding performance are not affected. The auxiliary component may be present from 0.5 to 25 wt %, based on the total weight of the adhesive composition.

Various biocides may be included to prolong the shelf life of the adhesive compositions described herein. Biocides may generally include, but are not limited to, germicides, antibacterials, antifungals, and fungicides. Exemplary biocides include isothiazolinones, zinc and sodium pyrithione, 2-bromo-2-nitro-1,3-propandiol as well as biocides which a routinely used in home and personal care products such as sorbic acid or benzoic acid.

Fillers, also referred to as extenders, may be added to the adhesive composition to improve working properties, permanence, and strength. The fillers may be lignocellulosic or organic in nature. Preferred fillers useful in the adhesive compositions herein may be, for example, calcium carbonate, magnesite, dolomite, kaolin, mica, talc, silica, calcium sulfate, feldspar, barium sulfate and opaque polymers. The fillers may be used as individual components. Mixtures of fillers such as, for example, calcium carbonate/kaolin and calcium carbonate/kaolin/talc have also been found to be particularly useful in practice.

Starches may be included in the adhesive composition to increase viscosity. Exemplary starches include maize, wheat, potato, arrowroot, rice, sago, barley, sorghum, rye, triticale, tapioca, waxy maize, waxy sorghum, sweet potato, waxy rice, mung bean, and modified versions and derivatives thereof. In some embodiments, the starch may be modified maize starch.

Dispersing agents may be included in the adhesive composition to improve the separation of the particles and to prevent settling or clumping of the particles. Dispersing agents may include, for example, polyacrylates or polyphosphates.

Defoamers may be added to the adhesive composition to reduce the formation of foam. However, it is understood that the defoamer does not act as a plasticizing agent. Exemplary defoamers include mineral oil defoamers or silicone defoamers.

Other additives such as urea may be added to the adhesive composition for instance to adjust the open time of the formulation.

Adhesive Composition Properties

The adhesive compositions as prepared herein will generally have a high heat resistance with a bond strength according to DIN EN 14257:2019 (WATT91) of at least 3 N/mm$^2$, e.g., at least 4 N/mm$^2$, such as at least 4.5 N/mm$^2$, preferably at least 5 N/mm$^2$, more preferably at least 5.5 N/mm$^2$, and most preferably at least 6 N/mm$^2$. A preferred method for measuring heat resistance according to WATT91 is detailed in the test methods section below.

The adhesive compositions as described herein will generally have a D3-3 bond strength according to DIN EN 204:2016 of at least 2 N/mm$^2$, such as at least 2.5 N/mm$^2$, preferably at least 2.75 N/mm$^2$, and more preferably at least 3 N/mm$^2$. A preferred method for measuring D3-3 bond strength is detailed in the test methods section below.

The adhesive compositions as described herein will generally have a minimum film formation temperature (MFFT) of less than 15° C., e.g., less than 10° C., more preferably less than 7° C., more preferably less than 4° C. MFFT is preferably determined according to DIN ISO 2115:2001-04.

The adhesive compositions as described herein will generally have a (mid-point) glass transition temperature (Tg) of 30° C. or less, preferably 25° C. or less, more preferably 23° C. or less, as measured by differential scanning calorimetry (DSC) according to DIN EN ISO 16805:2005-07.

As a measure of storage stability, the adhesive compositions as described herein will generally have a gel strength (ICI/TQC Sheen Gel Strength Tester) after 20 days at 50° C. of less than 120 gm/cm, preferably less than 50 gm/cm, more preferably less than 30 gm/cm, and most preferably less than 25 gm/cm. ICI gel strength values may be determined by various methods. A preferred method is detailed in the test methods section below.

Substrates for Adhesive Composition

The adhesive compositions described herein may be used to bind together at least two substantially planar porous or semi-porous substrates. The porous or semi-porous substrates may include wood, veneer, MDF, chip board, fiber board, paper, and combinations thereof. In some embodiments, the porous or semi-porous substrates may include hardwood, plywood, particleboard, MDF, oriented strandboard, and combinations thereof. In a preferred embodiment, the porous or semi-porous substrates comprise wood.

The adhesive compositions may be applied by the use of roller coating, knife coating, extrusion, curtain coating, foam coaters and spray coaters, one example of which is the spinning disk resin applicator. The adhesive compositions described herein may be suitable for manual or mechanical application and also for applications in which the adhesive joints are hardened by high-frequency alternating currents or hydraulic hot presses.

The adhesive compositions may also be used in the production of waterproof bonds and coatings of paper, cardboard, corrugated cardboard, foam, cement, leather, textile or pressed laminates; as binders for textiles and non-woven (e.g., engineered) fabrics; in textile printing and textile finishing; as a binder for glass fibers, which are used, e.g., for the consolidation of plastic tiles, moldings and as insulating material; or as a binder for ceramics.

The bonding of the at least two layers substrates includes a drying process for the adhesive composition. In some embodiments, the adhesive composition may airy dry at room temperature. In other embodiments, the adhesive composition is applied to the porous or semi-porous substrate and is then pressed at a temperature of greater than 15° C., e.g., greater than 20° C., greater than 30° C., or greater than 40° C. In terms of ranges, the pressing temperature may range from 40° C. to 150° C., e.g., 40° C. to 120° C. Temperatures above 150° C. are possible but may lead to damaging the porous or semi-porous substrate. However, depending on the substrate, temperatures above 150° C. may be utilized.

The present disclosure will be better understood in view of the following non-limiting examples.

EXAMPLES

Test Methods

Solid content: the solid contents of the copolymer dispersions or adhesive compositions were determined following DIN EN ISO 3251:2008. Two individual samples per batch were measured and the mean value and the standard deviation were calculated.

Brookfield viscosity: the apparent viscosities of the copolymer dispersions or adhesive compositions were determined following DIN EN ISO 2555:1999 at 20° C. and 20 rpm using Brookfield spindles #5 or #6 according to manufacturer instructions (i.e., the appropriate spindles for the viscosity of the polymer dispersions or adhesive compositions were chosen based on optimal viscosity ranges as specified by the instrument manufacturer).

Grit content: Approximately 250 g of the copolymer dispersion are diluted with a similar amount of deionized (DI) water and homogenized by gentle stirring. The diluted copolymer dispersion is filtered over a non-corroding metal sieve (DIN ISO 3310-1) with a mesh size of 40 µm. The metal sieve with residue is carefully rinsed with DI water to remove excess aqueous copolymer dispersion. The remaining residue (grit) on the metal sieve is dried at 130° C. for 15 mins and then cooled down to room temperature. The metal sieve with residue is then weighed. The grit content in % is defined as:

$$\text{grit content (\%)} = \left(\frac{m_2 - m_1}{m_0}\right) \cdot 100$$

$m_0$: mass of copolymer dispersion in gram
$m_1$: mass of metal sieve without residue in gram
$m_2$: mass of metal sieve with residue in gram Glass transition temperature: the glass transition temperatures (Tg) of the copolymer dispersions or adhesive compositions were measured by differential scanning calorimetry (DSC) according to DIN EN ISO 16805:2005-07 and referenced as midpoint values.

Minimum film formation temperature: the minimum temperature required for thin films of copolymer dispersions or adhesive compositions to form a film is referred to as the minimum film forming temperature (MFFT) and measured according to DIN ISO 2115:2001-04.

ICI gel strength (storage stability): the gel strength values of the copolymer dispersions or adhesive compositions were measured using an ICI Gel Strength Tester 414N of Sheen Instruments Ltd. 200 mL of sample were placed in a sealable cup and stored for 5, 10 and 20 days at 50° C. in an oven. After 5, 10 and 20 days, the ICI gel strength was measured at room temperature following the instructions of the instrument manufacturer. The resulting data is provided in g/cm.

Particle size distribution: the particle size distributions (PSD) of the copolymer dispersions or adhesive compositions were measured by a combination of laser diffraction and polarization intensity differential scattering (PIDS) using a Beckman Coulter LS 13320 Particle Size Analyzer.

Open time of wood adhesive composition: the open times of the adhesive compositions were tested on limba plywood panels (300 mm×300 mm×5 mm). A 300 µm film was applied to the panel using a doctor blade in a climate chamber equilibrated to 23° C. at 50% relative humidity. Directly thereafter, the film was gently tested with a clean fingertip every 30 sec. The open time is the time after which no adhesive stuck to the fingertip.

Setting speed: the setting speeds of the adhesive compositions were tested on steamed beech wood panels (85 mm×20 mm×3 mm). A film with an approximate coating weight of 150 g/m² was applied to the panel using a rod-shaped doctor blade, resulting in an area of 15 mm×20 mm. On top of this area, uncoated panels of the same kind were placed and joined using a pneumatic press with a pressure of 0.1 N/mm². After pressing, the joined beech wood panels were tested with a tensile strength tester after 2.5 and 5 minutes. The average of five individual joint panels was determined as the bonding strength in N/mm².

Classification of adhesives for non-structural applications (D3): Adhesive composition test specimens were prepared in accordance with DIN EN 205:2016 and the tests on D3 were conducted according to DIN EN 204:2016 with the following parameters:

| | |
|---|---|
| coating weight: | 150 ± 20 g/m² on both substrates |
| open waiting time: | 3 minutes |
| closed waiting time: | 3 minutes |
| time for pressing: | 2 hours |
| pressure used for pressing: | 0.7 ± 0.1 N/mm² |
| number of test specimens per series for tests: | 10 |
| test after storage at: | 7 days at 23° C. ± 2° C. and 50% ± 5% rel. humidity |
| storage sequence according to DIN EN 204 D3-3: | 4 days in cold water (20 ± 5° C.) |
| temperature during test: | 23° C. ± 2° C. |
| feed rate: | 50 mm/min |

Determination of tensile strength of lap joints at elevated temperature (WATT91): Adhesive composition test specimens were prepared in accordance with DIN EN 205:2016 and the tests on heat resistance were conducted according to DIN EN 14257:2019 (WATT91) with the following parameters:

| | |
|---|---|
| coating weight: | 150 ± 20 g/m² on both substrates |
| open waiting time: | 3 minutes |
| closed waiting time: | 3 minutes |
| time for pressing: | 2 hours |
| pressure used for pressing: | 0.7 ± 0.1 N/mm² |
| number of test specimens per series for tests: | 10 |
| test after storage at: | 60 ± 2 mins at 80° C. ± 2° C. |
| temperature during test: | 80° C. ± 2° C. |
| feed rate: | 50 mm/min |

Example 1 (Inventive)

An aqueous solution was prepared by dissolving 233 g of a polyvinyl alcohol with a degree of hydrolysis of 88 mol % and a with a Hoeppler viscosity of 8 mPa*s (at 4 wt % in agreement with DIN 53015:2001), 466 g of a polyvinyl alcohol with a degree of hydrolysis of 88 mol % and a with a Hoeppler viscosity of 32 mPa*s (at 4 wt % in agreement with DIN 53015:2001) and 175 g of a polyvinyl alcohol with a degree of hydrolysis of 92 mol % and a with a Hoeppler viscosity of 30 mPa*s (at 4 wt % in agreement with DIN 53015:2001) in 10120 g of deionized water while stirring. The polyvinyl alcohol solution was subsequently heated to 92° C. and kept at this temperature under stirring for at least 1 hour before it was cooled to room temperature. 3.7 g of defoamer (Muenzing, Agitan 301) were added followed by 3.9 g of ferrous sulphate heptahydrate, followed by 30.3 g of sodium acetate. Then the pH was adjusted to approximately 4.5 with phosphoric acid. The aqueous solution was charged to a 27-litre pressure reactor equipped with a stirrer, dosage pumps and a mass flow meter for dosing ethylene. The reactor was degassed twice by consecutive evacuating, and pressurizing with nitrogen to 2 bar.

7865 g of vinyl acetate (VAM pre-charge) was pumped into the reactor, and the temperature was raised to 45° C. 291 g of ethylene (E pre-charge) was metered to the reactor, followed by 10% of a reducer solution comprising 14.2 g of Brueggolite FF6 (Brueggemann) and 5.7 g of sodium bicarbonate dissolved in 454 g of deionized water. A second aqueous solution (aqueous slow-addition) was prepared comprising 194 g of Aerotex NMA-LF (Allnex) dissolved in 583 g of deionized water. Aerotex NMA-LF is an aqueous solution of 28 wt % N-methylol acrylamide, 20 wt % acrylamide, and less than 0.2 wt % formaldehyde.

When the reactor temperature stabilized at 45° C., the additions of an oxidizer solution comprising 13.9 g of 70% active t-butyl hydroperoxide dissolved in 442 g of deionized water and the remaining 90% of the reducer solution were commenced at a constant rate to last 260 minutes. The jacket temperature was increased to 80° C., and the internal temperature was allowed to rise by the combination of reaction and external heating. The maximum pressure during the whole reaction time was kept below 50 bar.

At approximately 50° C., the addition of the aqueous slow-add solution was started to last for 160 minutes at a constant rate. At 75° C., a further 873.9 g of ethylene (E slow-addition) was added at a rate to last 60 minutes or longer at 50 bar maximum pressure and another 2662 g of vinyl acetate (VAM slow-addition) was added at a rate to last 180 min or longer. When the reactor temperature reached 72° C., it was switched to internal temperature control, and the water jacket temperature was varied to keep the reaction temperature at 80° C. until all additions were complete.

After the additions of the oxidizer and reducer solutions were finished, the reactor was cooled to 55° C., and the contents were transferred to a second vessel. After transfer, a solution comprising 8.7 g of Brueggolite FF6 in 116.5 g of deionized water was added over 5 minutes. Concomitantly, a solution comprising 16.7 g of t-butylhydroperoxide in 58.3 g of deionized water was added, and the temperature was kept at 50° C. for 30 minutes. The vessel was cooled, the contents discharged, and the resultant dispersion was filtered through a 180 µm mesh.

All copolymer dispersions in the examples given in this patent were physically de-monomerized using a rotational evaporator (Büchi, Rotavap) to meet vinyl acetate residual levels of <100 ppm. Analytical test results, monomer compositions as well as application test results for all Examples are listed in Tables 1-3 below.

Example 2 (Comparative)

A similar procedure was followed as for Example 1, except that the amount of Aerotex NMA-LF (Allnex) was lowered to 97 g.

Example 3 (Inventive)

A similar procedure was followed as for Example 1, except that the amount of Aerotex NMA-LF (Allnex) was increased to 597 g.

Example 4 (Inventive)

A similar procedure was followed as for Example 1, except that the amounts of vinyl acetate and ethylene were modified according to Table 1.

Example 5 (Inventive)

A similar procedure was followed as for Example 1, except that the amounts of vinyl acetate and ethylene were modified according to Table 1.

Example 6 (Inventive)

A similar procedure was followed as for Example 1, except that the amount of polyvinyl alcohol with a degree of hydrolysis of 88 mol % with a Hoeppler viscosity of 32 mPa*s (at 4 wt % in agreement with DIN 53015:2001) was decreased to 291.3 g whereas 174.8 g of an ethylenically-modified polyvinyl alcohol (Kuraray, Exceval RS1717) was utilized in addition as a protective colloid.

Example 7 (Inventive)

A similar procedure was followed as for Example 1, except that the amount of polyvinyl alcohol with a degree of hydrolysis of 92 mol % with a Hoeppler viscosity of 30 mPa*s (at 4 wt % in agreement with DIN 53015:2001) was replaced by the same amount of a polyvinyl alcohol with a degree of hydrolysis of 88 mol % with a Hoeppler viscosity of 32 mPa*s (at 4 wt % in agreement with DIN 53015:2001).

Example 8 (Inventive)

A similar procedure was followed as for Example 1, except that 288 g of vinyl acetate of the monomer feed during the polymerization were replaced by 288 g of a 1:1 wt % mixture of methyl methacrylate and n-butyl acrylate.

Example 9 (Inventive)

A similar procedure was followed as for Example 1, except that 2.3 g of 1,6-hexandiol diacrylate was added to the stage 2 vinyl acetate monomer feed.

Example 10 (Comparative)

This Example represents a 1:1 laboratory scale-down of a commercially available D3 vinyl acetate homopolymer grade (Vinamul 8805, Celanese). Herein, 10 wt % of the vinyl acetate monomer were replaced by ethylene and the amount of Aerotex NMA-LF (Allnex) was adjusted to match the relative amount used in Example 1. The resultant dispersion showed a poor storage stability and solidified at room temperature after a few days, which made any further tests impossible.

Example 11 (Comparative)

A 6.5:3.5 mixture based on weight of a commercially available vinyl acetate homopolymer dispersion (Mowilith LDL 2555, Celanese) and a commercially available vinyl acetate-ethylene copolymer dispersion (Mowilith DM 107, Celanese) were prepared.

TABLE 1

Monomer composition of the copolymer dispersions as per Examples 1-9 in weight percent based on wet dispersion with a theoretical solid content of 52%. Comparative Examples are marked with a "C".

| Example | VAM pre-charge (wt %) | VAM slow-addition (wt %) | VAM total (wt %) | E pre-charge (wt %) | E slow-addition (wt %) | E total (wt %) | Aerotex NMA-LF (wt %) |
|---|---|---|---|---|---|---|---|
| 1  | 32.3 | 10.8 | 43.0 | 1.2 | 3.6 | 4.8 | 0.8 |
| C2 | 32.3 | 10.8 | 43.0 | 1.2 | 3.6 | 4.8 | 0.4 |
| 3  | 32.3 | 10.8 | 43.0 | 1.2 | 3.6 | 4.8 | 2.5 |
| 4  | 32.5 | 11.9 | 44.4 | 1.2 | 2.4 | 3.6 | 0.8 |
| 5  | 32.3 | 9.6  | 41.8 | 1.2 | 4.8 | 6.0 | 0.8 |
| 6  | 32.3 | 10.8 | 43.0 | 1.2 | 3.6 | 4.8 | 0.8 |
| 7  | 32.5 | 10.8 | 43.3 | 1.2 | 3.6 | 4.8 | 0.8 |
| 8  | 32.5 | 9.5  | 42.0 | 1.2 | 3.6 | 4.8 | 0.8 |
| 9  | 32.3 | 10.8 | 43.0 | 1.2 | 3.6 | 4.8 | 0.8 |

TABLE 2

Summary of analytical data for the copolymer dispersions as per Examples 1-11. Comparative Examples are marked with a "C".

| Example | Solid content (wt %) | pH | Brookfield viscosity (mPas) | Grit (%) | Tg (C) | Formaldehyde (ppm) |
|---|---|---|---|---|---|---|
| 1 | 51.2 | 5.4 | 13360 | <0.01 | 23 | 20 |
| C2 | 51.7 | 5.4 | 12760 | <0.01 | 23 | 6 |
| 3 | 50.8 | 5.0 | 25800 | 0.012 | 24 | 53 |
| 4 | 51.2 | 5.0 | 13800 | 0.011 | 25 | 17 |
| 5 | 50.8 | 5.0 | 13800 | <0.01 | 21 | 20 |
| 6 | 50.5 | 5.3 | 10160 | <0.01 | 23 | 20 |
| 7 | 51.2 | 4.8 | 16600 | <0.01 | 22 | 21 |
| 8 | 50.6 | 4.7 | 12000 | <0.01 | 23 | 24 |
| 9 | 51.9 | 4.7 | 15200 | <0.01 | 23 | 19 |
| C10 | Not applicable: dispersion was unstable and no further analysis was possible. | | | | | |
| C11 | 54.7 | 4.9 | 15950 | — | 2.0/43.6 | n/a |

Adhesive Composition Testing

Adhesive composition formulation: Adhesive compositions were prepared by adding either 12.8 g of a 54 wt % active aqueous solution of aluminum chloride hexahydrate or 14.3 g of a 62 wt % active aqueous solution of aluminum nitrate nonahydrate and 0.16 g defoamer (Agitan 305, Muenzing) to 371.4 g of copolymer dispersion prepared according to Example 1-11. The mixtures were stirred for 5 minutes at 350 rpm at room temperature with a standard lab stirrer until a homogeneous mixture was obtained. The resulting composition was used 1 to 24 hours after mixing. Analytical tests of the adhesive compositions were performed according to the methods described above. The results are summarized in Table 3.

TABLE 3

Summary of analytical data for the adhesive compositions based on Examples 1-11.

| Adhesive composition based on Example | D3-3 (N/mm$^2$) | WATT91 (N/mm$^2$) | Open time (min) | Setting speed (bond strength after 5 min (N/mm$^2$)) | ICI gel strength (g/cm) after 20 days at 50° C. | MFFT (° C.) |
|---|---|---|---|---|---|---|
| 1 | 3.0 | 6.1 | 9.5 | 3.0 ± 0.9 | 48 | 6 |
| C2 | 1.4 | 5.2 | 9.5 | 2.7 ± 0.6 | 4 | 5 |
| 3 | 3.2 | 7.5 | 8.5 | 4.0 ± 0.4 | solid | 5 |
| 4 | 2.5 | 5.8 | 12.5 | 3.6 ± 0.8 | 8 | 5 |
| 5 | 2.3 | 5.3 | 12.0 | 4.0 ± 0.5 | 20 | 3 |
| 6 | 2.1 | 6.7 | 12.0 | 3.9 ± 0.5 | 30 | 6 |
| 7 | 2.4 | 5.5 | 14.0 | 4.1 ± 0.8 | 118 | 3 |
| 8 | 3.1 | 6.2 | 15.0 | 3.7 ± 0.8 | 50 | 4 |
| 9 | 2.8 | 5.8 | 9.0 | 4.4 ± 0.5 | 95 | 5 |
| C10 | Not applicable: dispersion was unstable and no further analysis was possible. | | | | | |
| C11 | 1.0 | 5.5 | 8.0 | — | — | 5 |

Illustrations

Illustration 1: An adhesive composition comprising an aqueous copolymer dispersion comprising: at least one copolymer of at least one vinyl ester of a $C_{1-13}$ alkanoic acid co-monomer, at least one alpha-olefin co-monomer, and at least one auxiliary co-monomer selected from the group consisting of N-alkylol-containing co-monomers, unsaturated silane co-monomers, glycidyl ether/epoxy co-monomers, cyclic ureido co-monomers, acrylamido glycolic acid co-monomers, and combinations thereof; and at least one stabilizer selected from the group of polyvinyl alcohols; wherein the copolymer comprises, based on dried polymer, from 60 to 95 wt % of the $C_{1-13}$ alkanoic acid, from 1 to 35 wt % of the alpha-olefin, from 0.1 to 5 wt % of the at least one auxiliary co-monomer, and from 0.5 to 20 wt % of the at least one stabilizer; and wherein the adhesive composition has an MFFT lower than 15° C., a D3-3 bond strength greater than 2 N/mm² according to DIN EN 204:2016, and a bond strength greater than 4 N/mm² according to DIN EN 14257:2019 (WATT91).

Illustration 2: The adhesive composition of Illustration 1, wherein the at least one vinyl ester of a $C_{1-13}$ alkanoic acid comprises vinyl acetate.

Illustration 3: The adhesive composition of any preceding Illustration, wherein the alpha-olefin is ethylene.

Illustration 4: The adhesive composition of any preceding Illustration, wherein the auxiliary co-monomer comprises at least one N-alkylol-containing co-monomer.

Illustration 5: The adhesive composition of Illustration 4, wherein the auxiliary co-monomer comprises from 0.25 to 1.5 wt %, preferably 0.3 to 1.0 wt %, most preferably 0.35 to 0.75 wt % of N-methylolacrylamide based on dried polymer.

Illustration 6: The adhesive composition of any preceding Illustration, wherein the copolymer dispersion comprises from 2 wt % to 10 wt %, preferably from 4 wt % to 8 wt % and most preferably from 5 wt % to 7 wt % of polyvinyl alcohol based on dried polymer.

Illustration 7: The adhesive composition of any preceding Illustration, wherein the relative ratio of polyvinyl alcohols with a degree of hydrolysis greater than 90 mol % and/or ethylene-modified polyvinyl alcohol copolymers to polyvinyl alcohols with a degree of hydrolysis equal or smaller than 90 mol % is 0 to 0.5, preferably 0.13 to 0.33, and most preferably 0.2 to 0.25.

Illustration 8: The adhesive composition of any preceding Illustration, wherein the relative ratio of polyvinyl alcohols with a Hoeppler viscosity greater than 16 mPa*s is larger than 25 wt %, preferably larger than 50 wt %, more preferably larger than 65 wt % and most preferably larger than 70 wt %, based on the total amount of polyvinyl alcohol in the adhesive composition.

Illustration 9: The adhesive composition of any preceding Illustration, wherein the copolymer comprises an additional co-monomer, preferably selected from the group consisting of esters of methacrylic acid, esters of acrylic acid, vinyl halides, and combinations thereof.

Illustration 10: The adhesive composition of any preceding Illustration, wherein the adhesive composition comprises an aqueous polyvinyl ester copolymer dispersion with a solid content in the range of 30 to 65 wt %, preferably 40 to 60 wt %, and most preferably 45 to 55 wt %.

Illustration 11: The adhesive composition of any preceding Illustration, wherein the adhesive composition comprises less than 300 ppm formaldehyde, preferably less than 150 ppm formaldehyde, more preferably less than 50 ppm formaldehyde, and most preferably less than 25 ppm formaldehyde.

Illustration 12: The adhesive composition of any preceding Illustration, wherein the adhesive composition comprises less than 1 wt % plasticizer, preferably less than 0.5 wt % plasticizer, more preferably less than 0.1 wt % plasticizer, and most preferably no measurable plasticizer.

Illustration 13: The adhesive composition of any preceding Illustration, wherein the adhesive composition has a bond strength according to DIN EN 14257:2019 (WATT91) of at least 4.5 N/mm², preferably at least 5 N/mm², more preferably at least 5.5 N/mm², and most preferably at least 6 N/mm².

Illustration 14: The adhesive composition of any preceding Illustration, wherein the adhesive composition has a D3-3 bond strength according to DIN EN 204:2016 of at least 2.5 N/mm², preferably at least 2.75 N/mm², and more preferably at least 3 N/mm².

Illustration 15: The adhesive composition of any preceding Illustration, wherein the copolymer dispersion has a minimum film forming temperature (MFFT) of less than 10° C., preferably less than 7° C., more preferably less than 4° C.

Illustration 16: The adhesive composition of any preceding Illustration, wherein the copolymer dispersion has a glass transition temperature (Tg) of 30° C. or less, preferably 25° C. or less, and more preferably 23° C. or less.

Illustration 17: The adhesive composition of any preceding Illustration, wherein the adhesive composition has an ICI gel strength after 20 days at 50° C. of less than 120 gm/cm, preferably less than 50 gm/cm, more preferably less than 30 gm/cm, and most preferably less than 25 gm/cm.

Illustration 18: The use of the adhesive composition of any preceding Illustration for adhesively bonding porous or semi-porous substrates, preferably including wood, paper, and/or board, and more preferably including wood.

Illustration 19: The adhesive composition of any preceding Illustration, wherein at least 40 wt %, preferably at least 50 wt %, more preferably at least 60 wt %, and most preferably at least 65 wt % of at least one co-monomer, based on the total amount of co-monomer utilized in the reaction, is added to the reactor before the initiation of polymerization.

While the invention has been described in detail, modifications within the spirit and scope of the invention will be readily apparent to those of skill in the art. It should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the invention.

We claim:

1. An adhesive composition comprising an aqueous copolymer dispersion comprising:

at least one copolymer of at least one vinyl ester of a $C_{1-13}$ alkanoic acid co-monomer, at least one alpha-olefin co-monomer, and at least one auxiliary co-monomer selected from the group consisting of N-alkylol-containing co-monomers, unsaturated silane co-monomers, glycidyl ether/epoxy co-monomers, cyclic ureido co-monomers, acrylamido glycolic acid co-monomers, and combinations thereof; and at least one stabilizer selected from the group of polyvinyl alcohols, wherein the group of polyvinyl alcohols comprise a first group of polyvinyl alcohols having a degree of hydrolysis greater than 90 mol % and a second group of polyvinyl alcohols having a degree of hydrolysis equal to or less than 90 mol %, wherein the first group of polyvinyl alcohols having a degree of hydrolysis greater than 90 mol % has a viscosity from 2 mPa*s to 35 mPa*s;

wherein the copolymer dispersion comprises, based on dried polymer, from 60 to 95 wt % of the $C_{1-13}$ alkanoic acid, from 1 to 35 wt % of the alpha-olefin, and from 0.1 to 5 wt % of the at least one auxiliary co-monomer, and from 0.5 to 20 wt % of the at least one stabilizer; and wherein the copolymer dispersion has a viscosity from 2000 mPa*s to 30,000 mPa*s at 25 to 65% solids;

wherein the adhesive composition has an MFFT lower than 15° C., a D3-3 bond strength greater than 2 N/mm² according to DIN EN 204:2016, and a bond strength greater than 4 N/mm² according to DIN EN 14257:2019 (WATT91).

2. The adhesive composition of claim 1, wherein the at least one vinyl ester of a $C_{1-13}$ alkanoic acid comprises vinyl acetate.

3. The adhesive composition of claim 1, wherein the alpha-olefin is ethylene.

4. The adhesive composition of claim 1, wherein the auxiliary co-monomer comprises at least one N-alkylol-containing co-monomer.

5. The adhesive composition of claim 4, wherein the auxiliary co-monomer comprises from 0.25 to 1.5 wt % of N-methylolacrylamide based on dried polymer.

6. The adhesive composition of claim 1, wherein the copolymer dispersion comprises from 2 wt % to 10 wt % of polyvinyl alcohol based on dried polymer.

7. The adhesive composition of claim 1, wherein the relative ratio of the first group of polyvinyl alcohols with a degree of hydrolysis greater than 90 mol % to the second group of polyvinyl alcohols with a degree of hydrolysis equal or smaller than 90 mol % is 0.13 to 0.33.

8. The adhesive composition of claim 1, wherein the percentage of polyvinyl alcohols with a Hoeppler viscosity greater than 16 mPa*s is larger than 25 wt % based on the total amount of polyvinyl alcohol in the adhesive composition.

9. The adhesive composition of claim 1, wherein the copolymer comprises an additional co-monomer, preferably selected from the group consisting of esters of methacrylic acid, esters of acrylic acid, vinyl halides, and combinations thereof.

10. The adhesive composition of claim 1, wherein the adhesive composition comprises an aqueous polyvinyl ester copolymer dispersion with a solid content in the range of 30 to 65 wt %.

11. The adhesive composition of claim 1, wherein the adhesive composition comprises less than 300 ppm formaldehyde.

12. The adhesive composition of claim 1, wherein the adhesive composition comprises less than 1 wt % plasticizer.

13. The adhesive composition of claim 1, wherein the adhesive composition has a bond strength according to DIN EN 14257:2019 (WATT91) of at least 4.5 N/mm².

14. The adhesive composition of claim 1, wherein the adhesive composition has a D3-3 bond strength according to DIN EN 204:2016 of at least 2.5 N/mm².

15. The adhesive composition of claim 1, wherein the copolymer dispersion has a minimum film forming temperature (MFFT) of less than 10° C.

16. The adhesive composition of claim 1, wherein the copolymer dispersion has a glass transition temperature (Tg) of 30° C. or less.

17. The adhesive composition of claim 1, wherein the adhesive composition has an ICI gel strength after 20 days at 50° C. of less than 120 gm/cm.

18. The adhesive composition of claim 1, wherein at least 40 wt % of at least one co-monomer, based on the total amount of co-monomer utilized in the reaction, is added to a reactor before the initiation of polymerization.

19. A porous or non-porous substrate, wherein the substrate comprises two surfaces which are bonded together by the adhesive composition of claim 1.

20. The porous or non-porous substrate of claim 19, wherein the porous or non-porous substrate comprises wood, paper, board, or combinations thereof.

* * * * *